(12) United States Patent
Etter et al.

(10) Patent No.: US 10,577,883 B2
(45) Date of Patent: Mar. 3, 2020

(54) WEATHERIZATION SYSTEM FOR A WELLHEAD EMISSION REDUCTION SYSTEM

(71) Applicant: Etter Engineering Company, Inc., Bristol, CT (US)

(72) Inventors: Thomas M. Etter, Middlefield, CT (US); Jon G. Moore, Sr., Hamden, CT (US); Alex Hansen, Burlington, CT (US)

(73) Assignee: Etter Engineering Company, Inc., Bristol, CT (US)

( * ) Notice: Subject to any disclaimer, the term of this patent is extended or adjusted under 35 U.S.C. 154(b) by 0 days.

(21) Appl. No.: 16/253,301

(22) Filed: Jan. 22, 2019

(65) Prior Publication Data

US 2019/0234168 A1     Aug. 1, 2019

Related U.S. Application Data

(60) Provisional application No. 62/623,109, filed on Jan. 29, 2018.

(51) Int. Cl.
*E21B 33/037*     (2006.01)
*B01D 53/86*     (2006.01)
(Continued)

(52) U.S. Cl.
CPC .......... *E21B 33/037* (2013.01); *B01D 53/864* (2013.01); *B01D 53/885* (2013.01);
(Continued)

(58) Field of Classification Search
None
See application file for complete search history.

(56) References Cited

U.S. PATENT DOCUMENTS

| | | |
|---|---|---|
| 7,364,712 B2 | 4/2008 | Ohtsuka et al. |
| 9,067,175 B2 | 6/2015 | Ohtsuka et al. |

(Continued)

FOREIGN PATENT DOCUMENTS

| | | | |
|---|---|---|---|
| CA | 2325966 A1 * | 5/2002 | ......... B01D 53/8668 |
| CA | 2325966 A1 | 5/2002 | |

(Continued)

OTHER PUBLICATIONS

Mallett et al., Progress in Developing Ventilation Air Methane Mitigation and Utilisation Technologies, CSIRO Exploration and Mining,Technology Court, Pullenvale, QLD 4069, Australia, Jun. 16, 2004, 19 pgs., http://www.coalinfo.net.cn/coalbed/meeting/2203/papers/coal-mining/CM003.pdf.

(Continued)

*Primary Examiner* — Walter D. Griffin
*Assistant Examiner* — Jelitza M Perez
(74) *Attorney, Agent, or Firm* — Moyles IP, LLC

(57) ABSTRACT

A weatherization system for a wellhead methane emission reduction system is described. The weatherization system reduces green-house gas emission into the atmosphere and reduces the effects of weather on the methane emission reduction system. The weatherization system includes a stack assembly connected to a housing of the reduction system by a housing adapter. The stack assembly includes a stack adapter and a stack cover, which collectively helps protect the methane emission reduction system and prevents weather or atmospheric factors from entering the housing. The weatherization system may include one or more sensors for measuring the effects of weather or degradation of at least one of the weatherization system and the methane emission reduction system.

18 Claims, 11 Drawing Sheets

(51) Int. Cl.
  *E21B 41/00* (2006.01)
  *B01D 53/88* (2006.01)
(52) U.S. Cl.
  CPC ........ *E21B 41/005* (2013.01); *E21B 41/0021* (2013.01); *B01D 2255/1021* (2013.01); *B01D 2255/1023* (2013.01); *B01D 2256/22* (2013.01); *B01D 2257/7025* (2013.01); *B01D 2258/02* (2013.01); *B01D 2258/06* (2013.01)

(56) References Cited

U.S. PATENT DOCUMENTS

| | | |
|---|---|---|
| 9,676,695 B2 | 6/2017 | Nunley et al. |
| 2011/0250115 A1 | 10/2011 | Chen et al. |
| 2017/0120191 A1* | 5/2017 | Nurkowski .......... B01D 53/885 |

FOREIGN PATENT DOCUMENTS

| | | |
|---|---|---|
| CN | 101915117 A | 12/2010 |
| CN | 102218286 A | 10/2011 |
| CN | 202700477 U | 1/2013 |

OTHER PUBLICATIONS

Peter Hinde, Comet—A New Ventilation Air Methane (VAM) Abatement Technology, Johnson Matthey Techn. Rev., 2016, 18 pgs., https://www.technology.matthey.com/article/60/3/211-221/.

* cited by examiner

WEATHERIZATION SYSTEM FOR A WELLHEAD EMISSION REDUCTION SYSTEM

CROSS-REFERENCE TO RELATED APPLICATIONS

This application claims priority to U.S. Provisional Application No. 62/623,109 filed Jan. 29, 2018, which is incorporated herein by reference in its entirety.

FIELD OF THE DISCLOSURE

A weatherization system for controlling methane emission of a wellhead is described. More specifically, the present disclosure relates to a weatherization system that monitors the operation and/or performance of a catalytic heater assembly included in the system. More specifically, a weatherization system that prolongs the useful life of a methane emission control system for a wellhead, while monitoring the effects of weather or atmospheric factors on the methane emission control system is described.

BACKGROUND OF THE DISCLOSURE

Political, scientific and sociological debate over the past twenty years has converged on the topic of global warming and the effects of production and venting of so-called greenhouse gases, or gasses that trap heat in the atmosphere. The effects of greenhouse gasses can be seen in the melting of the polar ice caps, rising sea levels, increases in the global average yearly temperature, extremes in weather (such has really hot or cold temperatures), allergies, and the effects on certain plant and animal species.

Some gases are more effective than others in making the planet warmer. Of the three most abundant greenhouse gases in the Earth's atmosphere, namely, water vapor, carbon dioxide, and methane, each of these gases can remain in the atmosphere for different amounts of time, ranging from a few years to thousands of years. While all of these most abundant greenhouse gases remain in the atmosphere long enough to become uniformly mixed and distributed in the atmosphere, the emitting of methane into the atmosphere is of primary concern. Thus, in 2012, the Environmental Protection Agency ("EPA") set a goal of reducing methane emissions by 40-45% from 2012 levels by 2025.

Methane is emitted during the production and transport of coal, natural gas, and oil. Methane emissions also result from livestock and other agricultural practices and by the decay of organic waste in municipal solid waste landfills. Methane is the primary component of natural gas, and is the principal greenhouse gas emitted by equipment and processes in the oil and gas sector; and, through leakage and venting during the process of drilling for oil and gas can have a serious effect on the atmosphere. While methane doesn't remain in the atmosphere as long as carbon dioxide does, it has far more devastating consequences to the climate because of how effectively it absorbs heat. In the first two decades after its release, methane became 84 times more detrimental than carbon dioxide.

More recently, the EPA has updated the New Source Performance Standards (or "NSPS") for the oil and gas industry to add requirements that the industry reduce emissions of greenhouse gases and to cover additional equipment and activities in the oil and gas production chain. The final rule will accomplish this by setting emissions limits for methane, which is the principal greenhouse gas emitted by equipment and processes in the oil and gas sector. To that end, on May 12, 2016, the EPA finalized the first-ever national rule to directly limit methane emissions from oil and gas operations. The final NSPS is expected to reduce 510,000 short tons of methane in 2025, or the equivalent of reducing 11 million metric tons of carbon dioxide. At natural gas well sites, the NSPS has mandated new requirements for detecting and repairing leaks, and requirements to limit emissions from certain specified equipment types.

Despite the strong push to reduce methane emissions, there has been recent changes in the political landscape that have resulted in stays of certain requirements under the EPA rule. For instance, on Nov. 1, 2017, the EPA announced that it is issuing two notices of data availability related to the agency's proposed stays of certain requirements in the 2016 NSPS for the oil and natural gas industry. Nevertheless, the overall trends continue to be toward the significant reduction of methane emissions in the oil and gas industry.

One consideration for the reduction of methane emissions in the industry is in the capture and catalyzation of wellhead emissions. U.S. Patent Publication No. 2017/0120191 A1, for a Wellhead Emission Control System, published May 4, 2017 to Nurkowski et al. (hereinafter "Nurkowski"), describes a system for introducing vented methane to a catalytic heater assembly resident in a housing unit to break down the methane in the presence of oxygen into a less harmful carbon dioxide and water. Though carbon dioxide is also a greenhouse gas, its short-term effects are less harmful to the atmosphere than that of methane.

Thus, what is not appreciated by the prior art is that regardless of what methodology is utilized to "treat" the vented methane to meet government standards and/or industry expectations, if the system employed is susceptible to maintenance, degradation of effectiveness, or flow-through issues, then the system may actually vent or leak to a point where more harm than good is created by the system.

Accordingly, there is a need for an improved system for capturing wellhead emissions which will provide the benefit of breaking methane down and creating a set of "less harmful" components. There is a further need for a weatherization system that withstands the rigors imposed on a wellhead that is resident outdoors in often harsh environments, and allows an operator to monitor the operation of the wellhead.

BRIEF DESCRIPTION OF THE EXEMPLARY EMBODIMENTS

The present embodiments may be associated with a weatherization system for methane emission control for a wellhead. The system may include a stack assembly that prevents weather or atmospheric factors from entering a housing of the weatherization system. According to an aspect, the stack assembly includes a stack adapter. The stack adapter includes an upper portion, a lower portion to engage the housing, and a plurality of walls extending between the upper and lower portions. According to an aspect, at least one of the plurality of walls has a sloped region that prevents weather or atmospheric factors from accumulating at the upper portion of the stack adapter. The stack assembly further includes a stack cover adjacent the upper portion of the stack adapter. The stack cover forms an exhaust point that facilitates exhaust flow out of the housing.

The present disclosure may further be associated with a weatherization system for methane emission control for a wellhead, which includes a housing, a catalytic heating assembly disposed within the housing and a stack assembly.

The effects of weather or other atmospheric conditions may be reduced by the use of weather-resistant materials and techniques in the system. According to an aspect, the housing includes an enclosed interior volume and the catalytic heating assembly is disposed within the enclosed interior volume of the housing. The catalytic heating assembly applies a level of heat sufficient to cause an exothermic oxidative reaction to a flow of a vented gas across the catalytic heating assembly. The exothermic oxidative reaction is configured to break down the vented gas into carbon dioxide and water vapor, which form an exhaust flow. According to an aspect, the exterior of the housing includes a surface resistant to degradation from the effects of one or more weather or atmospheric factors. The stack assembly, including the stack adapter and the stack cover is in a covering relationship with the housing. The stack adapter, in combination with the surface of the housing, may help to prevent or substantially reduce the effects of the weather or atmospheric factors on the system.

Further embodiments of the disclosure may be associated with the utilization of sensors to locally or remotely monitor the weatherization system, either alone or conjunction with the weather-resistant materials and techniques.

The above, and other aspects, features and advantages of the present invention, will become apparent from the following description read in conjunction with the accompanying drawings, in which like reference numerals designate the same elements.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Figure 1:
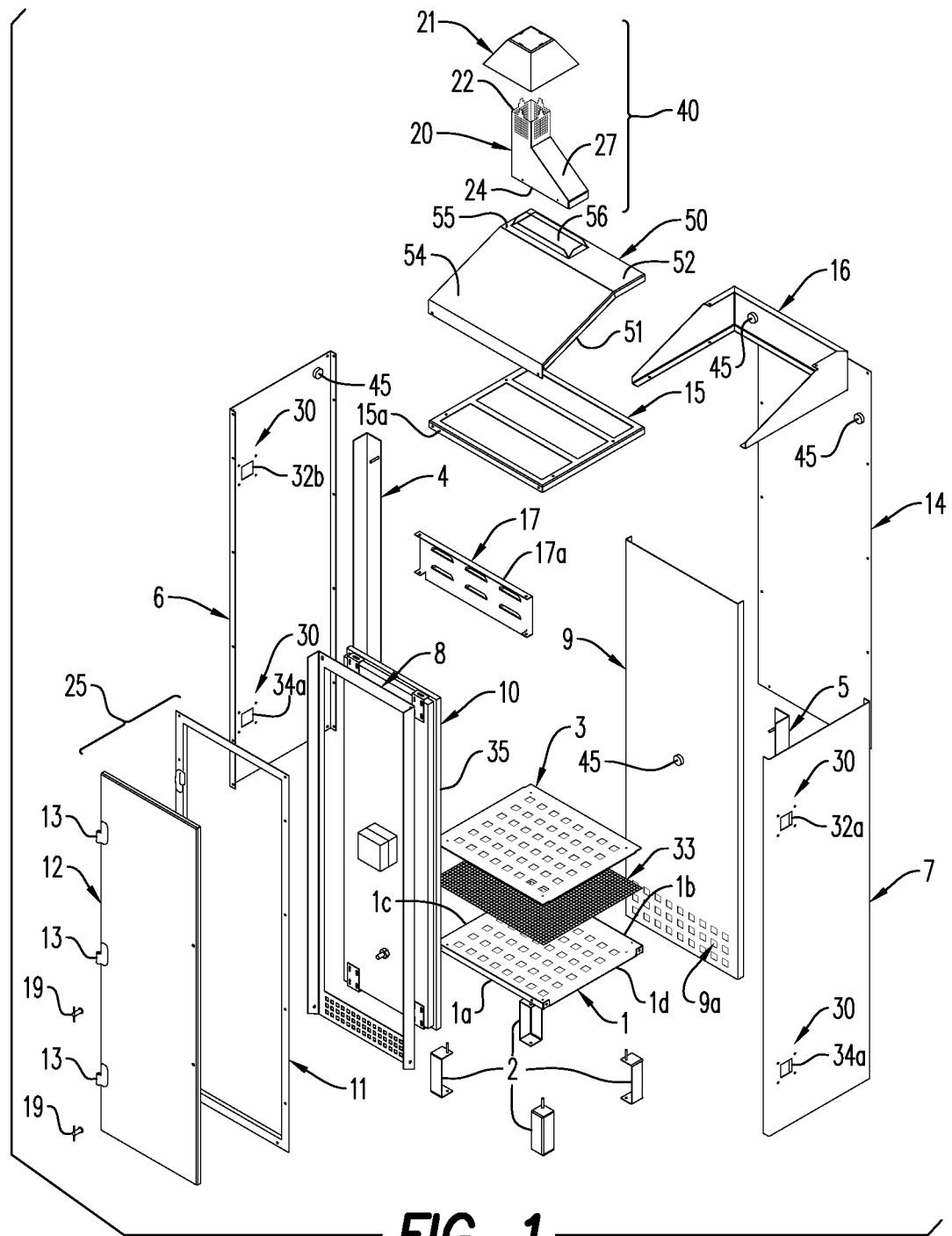
FIG. 1 is an exploded perspective view of a weatherization system for methane emission control for a wellhead, in an unassembled manner, according to an embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

Reference will now be made in detail to several embodiments of the invention that are illustrated in the accompanying drawings. Each example is provided by way of explanation and is not meant as a limitation and does not constitute a definition of all possible embodiments. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

FIG. 1 illustrates an exploded perspective view of a weatherization system 100. The weatherization system 100 may provide a weather-resistant means for methane emission control for a wellhead (not shown). The wellhead may be a natural gas or oil wellhead. One aspect of such a control system is to reduce green-house gas emissions into the atmosphere by providing a means for converting the flow of methane gas into carbon dioxide and water vapor. The system 100 causes vented gases to be directed from a wellhead toward the system 100 by a control valve (not shown) and piping so as to prevent the emission of methane to the atmosphere during the drilling process associated with oil and gas delivery. When in use, the valve is open to allow methane gas coming from the well casing to be directed toward a housing 102 of the system 100.

The weatherization system 100 may include a stack assembly 40, which helps prevent weather or atmospheric factors from entering the housing 102 of the system 100. The weather or atmospheric factors may include one or more of rain, snow, sleet, hail, ice, particulates, wind and wind-related structural damage, and other weather-propelled matter.

The stack assembly 40 may include a stack adapter 20. The stack adapter 20 includes an upper portion 22 and a lower portion 24. The lower portion 24 is configured for engaging the housing 102. A plurality of walls 26 extend between the upper and lower portions 22, 24, with at least one of the plurality of walls 26 including a sloped region 27. According to an aspect, the sloped region 27 helps to prevent the weather or atmospheric factors from accumulating at the upper portion 22 of the stack adapter 20.

The stack assembly 40 may further include a stack cover 21 adjacent the upper portion 22 of the stack adapter 20. The stack cover 21 may have an open upper end, which forms an exhaust point that facilitates exhaust flow out of the housing 102. According to an aspect, the stack cover 21 includes a cylindrical shape. The stack cover 21 may include a substantially pyramidal shape, with an upper region that is smaller in size than a corresponding lower region to help prevent or substantially reduce the accumulation of weather or atmospheric factors on the stack assembly 40. The pyramidal shape of the stack cover 21, in combination with the rectangular shape of the housing 102, may help to equalize the potential effect of directional wind on the system.

According to an aspect, the weatherization system 100 further includes a housing cover 50 adjacent the housing 102. The housing cover 50 may include a first panel 52 and a second panel 54 extending from or otherwise coupled to the first panel 52. As illustrated in FIG. 1, an opening 56 extends through the first panel 52. The stack adapter 20 may be coupled to the housing cover 50 so that the stack adapter extends over and covers the opening 56. This may help to facilitate exhaust flow out of the housing 102. According to an aspect, a housing adapter 16 is coupled to an underside 51 of the housing cover 50. The housing adapter 16 is configured to operably connect the housing cover 50 to the housing 102.

Further embodiments may be associated with a weatherization system 100 that includes a housing 102 that forms an enclosed interior volume, a catalytic assembly 35 disposed within the interior volume of the housing 102, and a stack assembly 40 in a covering relationship with the housing 102. The stack assembly 40 is substantially similar to the stack assembly 40 described hereinabove. Thus, for purposes of convenience and not limitation, the features and limitations of the stack assembly 40 described herein with reference to FIG. 1 are not repeated hereinbelow.

The housing 102 for the system 100 may be in the form of a substantially rectangular shape, such as a "shed". According to an aspect, the housing 102 includes a plurality of panels secured to a base 1. It is contemplated that the panels may be formed from a single metal sheet that is bent to form a three-dimensional structure, such as, for example the substantially rectangular shape. This may reduce the number of panels that need to the assembled to form the housing 102, as well as the time required to form the system 100. The outer surface of the housing 102 (i.e., the external surfaces of the panels) may be resistant to degradation that may result from exposure to one or more weather or atmospheric factors. As used herein, the phrase "resistant to degradation" means that the related structure maintains its structural integrity and its function for several years of exposure to the aforementioned weather or atmospheric factors.

According to an aspect, the housing 102 includes a perforated base plate 1. The base plate 1 may include a front edge 1a, and a back edge 1b parallel to the front edge 1a. The base plate 1 further includes a left side edge 1c perpendicular to the front and back edges 1a, 1b, and a right side edge 1d perpendicular to the front and back edges 1a, 1b and parallel to the left side edge 1c. According to an aspect, the perforations of the base plate 1 help allow the passage of air coming from an underside the housing 102 to enter the housing 102. A filter 33 is adjacent the perforated base plate 1. According to an aspect, the filter 33 prevents particulate matter or other impurities from entering the enclosed interior volume of the housing and causing degradation of the catalyst or housing interior by mixing with the methane or the catalyzed constituents. The filter 33 may include a mesh material. Additionally, a filter cover 3 may overly the filter 33 and secure it in place on top of the base plate 1.

The panels of the housing 102 are each attached to the perforated base plate 1. The panels include a back panel 14, a front panel 25, a left side panel 6 and a right side panel 7. The left side panel 6 is disposed between the front panel 25 and the back panel 14, and the right side panel 7 is disposed between the front panel 25 and the back panel 14. Each panel may be attached to the base plate 1 by any conventional attachment/fastening mechanism. According to an aspect, the panels are attached to the base plate 1 by screws, nuts and bolts, studs and bolts, rivets, and the like. The back panel 14 is attached to the back edge 1b of the base plate 1 at a bottom edge of the back panel 14, and extends between the left side panel 6 and the right side panel 7. The bottom edge of the back panel 14 and the back edge 1b of the base plate 1 are connected to/or meet each other perpendicularly. Similarly, the front panel 25 is attached to the front edge 1a of the base plate 1 at a bottom edge of the front panel 25, and extends between the left side panel 6 and the right side panel 7. As seen for instance in FIG. 1, the left side panel 6 may be attached to the left side edge 1c of the base plate 1, and the right side panel 7 may be attached to the right side edge 1d of the base plate 1.

The front panel 25 may include a door 12. According to an aspect, the door 12 may be secured to the housing 102 by a frame/doorframe 11. The door 12 may be connected to the frame 11 by a plurality of hinges 13. The hinges 13 allow the door 12 to move between an open position and a closed position. While the hinges 13 are illustrated as being coupled to a left side edge of the door 12, it is contemplated that the hinges 13 may be coupled to a right side edge of the door 12 (not shown). To facilitate user access to the internal space of the housing 102, at least one handle 19 may be coupled to the door 12. The handle 19 facilitates the secure opening and closing of the door 12.

To provide additional support for the structure of the housing 102, angle/corner supports 4, 5 may be secured to at least one corner of the housing 102. One angle support 4 may be positioned within the corners formed between left side panel 6 and the back panel 9, and another angle support 5 may be positioned between the right side panel 7 and the back panel 9. The angle supports 4, 5 may be attached to the panels 6, 7, 9 via any conventional securing mechanisms, such as screws.

According to an aspect, the housing 102 further includes an elevation mechanism 2 for maintaining the housing 102 is a spaced apart configuration from a floor or ground surface. The elevation mechanism 2 is located on the underside of the base plate 1. The elevation mechanism 2 may help to facilitate the flow of cool air from under the housing 102 into the interior volume of the housing 102, to aid in driving warm air up and out of the stack assembly 40. The elevation mechanism 2 may protect the inlet/enclosure from standing/accumulating snow, ice, water, and the like. According to an aspect, the elevation mechanism 2 includes a plurality of "feet" or "legs" that are affixed to the underside of the base plate 1 by screws or similar conventional means, and in such a location as to optimize the stability of the housing 102 relative to the ground plane and facilitate air flow. The elevation mechanism 2 may include a frame apparatus/structure mounted to the underside of the base plate. The selected elevation mechanism 2, feet or frame apparatus, may be shaped and sized to fit the particular needs of the application and may be based on where the housing 102 is to be located.

The weatherization system 100 further includes a catalytic heating assembly 35. The catalytic heating assembly 35 is positioned above the perforated base plate 1 and is disposed within the enclosed interior volume of the housing 102. The catalytic heating assembly 35 applies a level of heat sufficient to cause an exothermic oxidative reaction to a flow of a vented gas across the catalytic heating assembly 35. The exothermic reaction breaks down the vented gas into carbon dioxide in the presence of oxygen, which forms an exhaust flow.

The catalytic heating assembly 35 may include a heater frame 8 and a catalytic heater 10 disposed in the heater frame 8. The catalytic heater 10 may be configured as a substantially flat panel that may fold down and out of the enclosed interior volume of the housing 102. This allows the catalytic heater 10 to be changed in the field, if necessary, without deconstructing the entire housing 102. According to an aspect, the angle supports 4, 5 helps to hold the catalytic heater 10 in a secured configuration, when the catalytic heater 10 is folded down and out of the housing 102 (not shown).

According to an aspect, the start-up of the catalytic heater 10 may be facilitated by an electrical preheat current. The current may be provided by a temporary power source, such as a generator, which transports the power through a small housing that may attach to a power inlet port 32a. The power inlet port 32a may be resistant to potential degradation from exposure to one or more weather or atmospheric factors. The catalytic heater 10 may be powered by a battery, which preserves the integrity of the housing 102 by not requiring additional apertures in the panels of the housing 102. According to an aspect, a conventional power line may power the catalytic heater 10. As illustrated in FIG. 1, a louver panel 17 may be mounted on a top edge of the heater frame 8. The louver panel 17 may be manually adjusted to control the warmed exhaust gas flowing toward the exhaust point at the top of the stack assembly 40.

The weatherization system may include a divider plate 15 positioned above the catalytic heating assembly 35. The divider plate 15 may control the flow of exhaust within the housing 102, and help to prevent turbulent flow of the exhaust. The divider plate includes a lead edge 15a that is mounted on a top edge 17a of the louver 17.

According to an aspect, the system 100 includes a housing cover 50. The housing cover 50 is mounted over the divider plate 15, with a housing adapter 16 extending therebetween. The housing cover 50 includes a first panel 52 and a second panel 54 coupled to or otherwise extending from the first panel 52. The first panel 52 may be parallel to the ground or floor surface on which the weatherization system 100 is positioned. The second panel 54 slopes downwardly away from the first panel 52. An opening 56 extends through the first panel 52. The stack adapter 20 is coupled to a topside 55 of the housing cover 50 and extends over the opening 56, which allows the exhaust gases to pass through or vent through the stack assembly 40.

A housing adapter 16 is mounted on top of the divider plate 15. The housing adapter 16 includes a rear wall and two sidewalls extending from the rear wall. The housing adapter engages with or connects to the housing cover 50, and helps to secure the housing cover 50 to each of the side panels 6, 7, the front panel 25 and the back/rear panel 14.

Further embodiments of the present disclosure may be associated with a weatherization system 100 for a wellhead methane emission reduction system, which includes one or more sensors 45 mounted within the housing 102. Each of the sensors 45 can be utilized for measuring the effects of weather or atmospheric factors on the system 100. According to an aspect, the sensors may include one or more of a sensor for measuring temperature, a sensor for measuring humidity, a sensor for measuring vibration within the housing 102, and a sensor for measuring gas content within the housing 102. The sensors 45 may be interoperably connected with a transmitter to transmit a set of data from each sensor to a central processing unit. The central processing unit may generate a report that is illustrative of the temperature, humidity, vibration and gas content of the housing 102. The central processing unit may be co-located with, or may be at a location remote to the housing 102.

Figure 2:
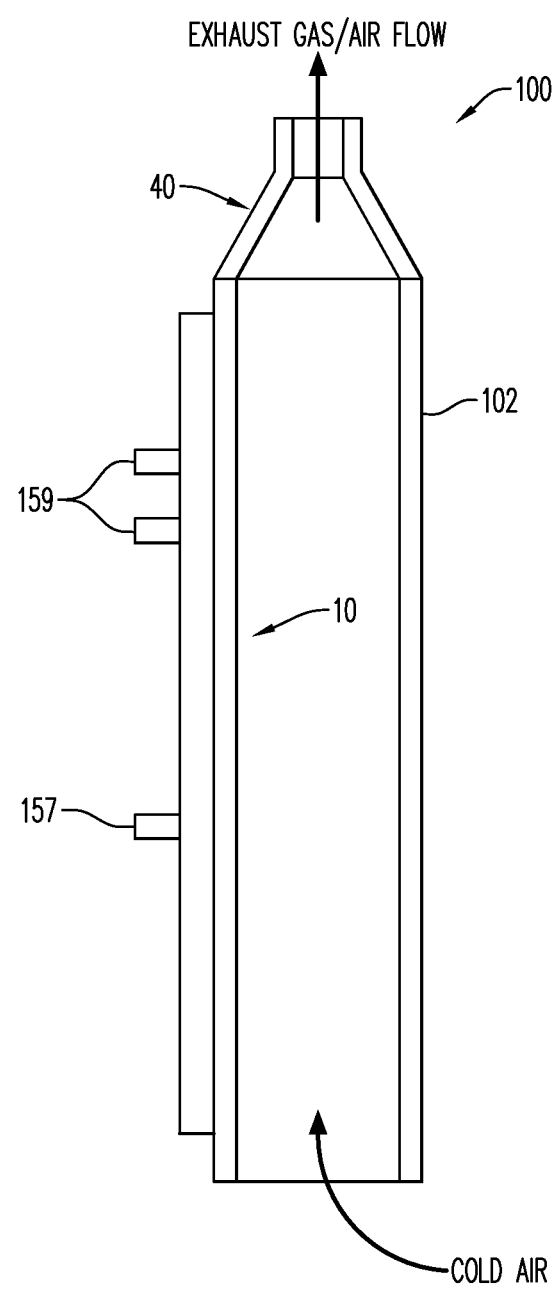
FIG. 2 is a schematic diagram of the airflow associated with moving a vented gas to a housing having a catalytic heater for the purpose of breaking down the vented gas, in accordance with the housing of FIG. 1.

Turning next to FIG. 2 there is shown a relationship diagram of the airflow associated with moving a vented gas through a housing 102 having a catalytic heating assembly 35 for the purpose of breaking down the vented gas, in accordance with the weatherization system 102 of FIG. 1.

FIG. 2 illustrates primary inbound portals for the housing 102. According to an aspect, the portals include the cold airflow (relative in temperature to the exhaust flow), which enters from beneath the housing 102 and enters the housing through the base plate 1. The portals may further include the vented gas input valve 157 for introducing the gas vented from the wellhead. The cold air/airflow enters the housing 102 by passing through the base plate 1, the filter 33, and the filter cover 3 before rising in the presence of the catalytic heater 10 of the catalytic heating assembly 35. While cold air enters and serves to bring reactive airflow to the catalytic heater 10, vented gas flow (methane) from the wellhead enters the housing 102 at gas input valve 157. The gas input valve 157 may be an interoperable connector that allows the gas flow to enter the housing 102 and be introduced to the catalytic heater 10.

The catalytic heater 10 may include electrical elements 159, which are energized to reach a catalytic activation temperature of the catalytic reaction that occurs in the presence of the catalyst, the vented gas, and oxygen. Once the catalytic reaction begins, it generates sufficient heat to maintain the reaction. Subsequently, the reaction causes the methane to break down into carbon dioxide and water. Any remaining gas is heated and rises in relation to the cold air entering at the bottom/underside/lower region of the housing 102. The heated air will flow through the stack assembly 40 as an exhaust gas to be vented.

Figure 3:
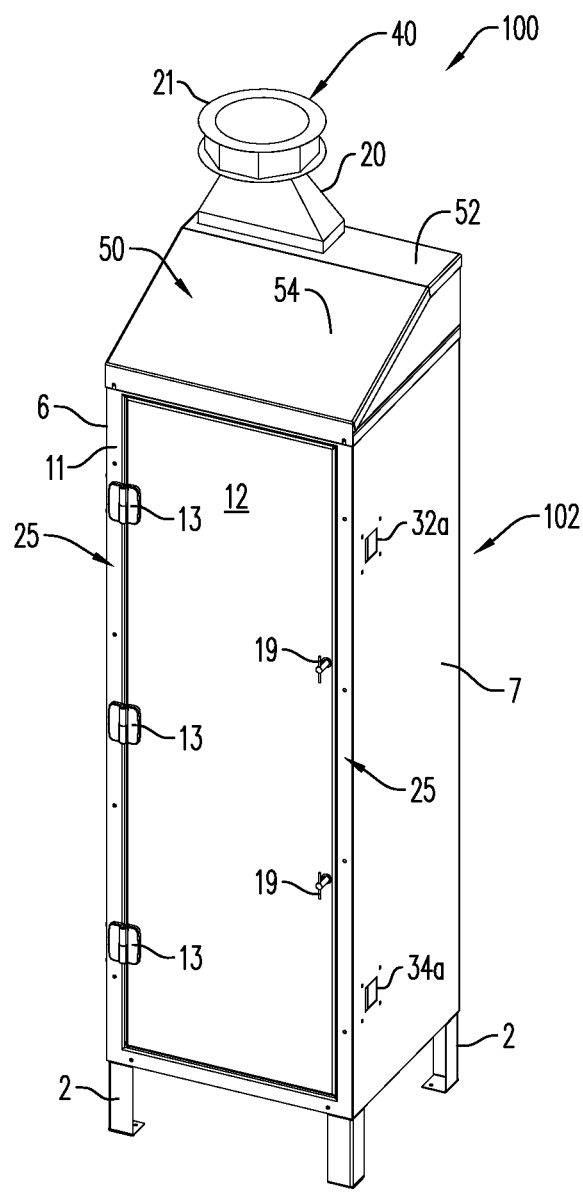
FIG. 3 is an exterior perspective view of a single housing unit for the system of FIG. 1.
Figure 4:
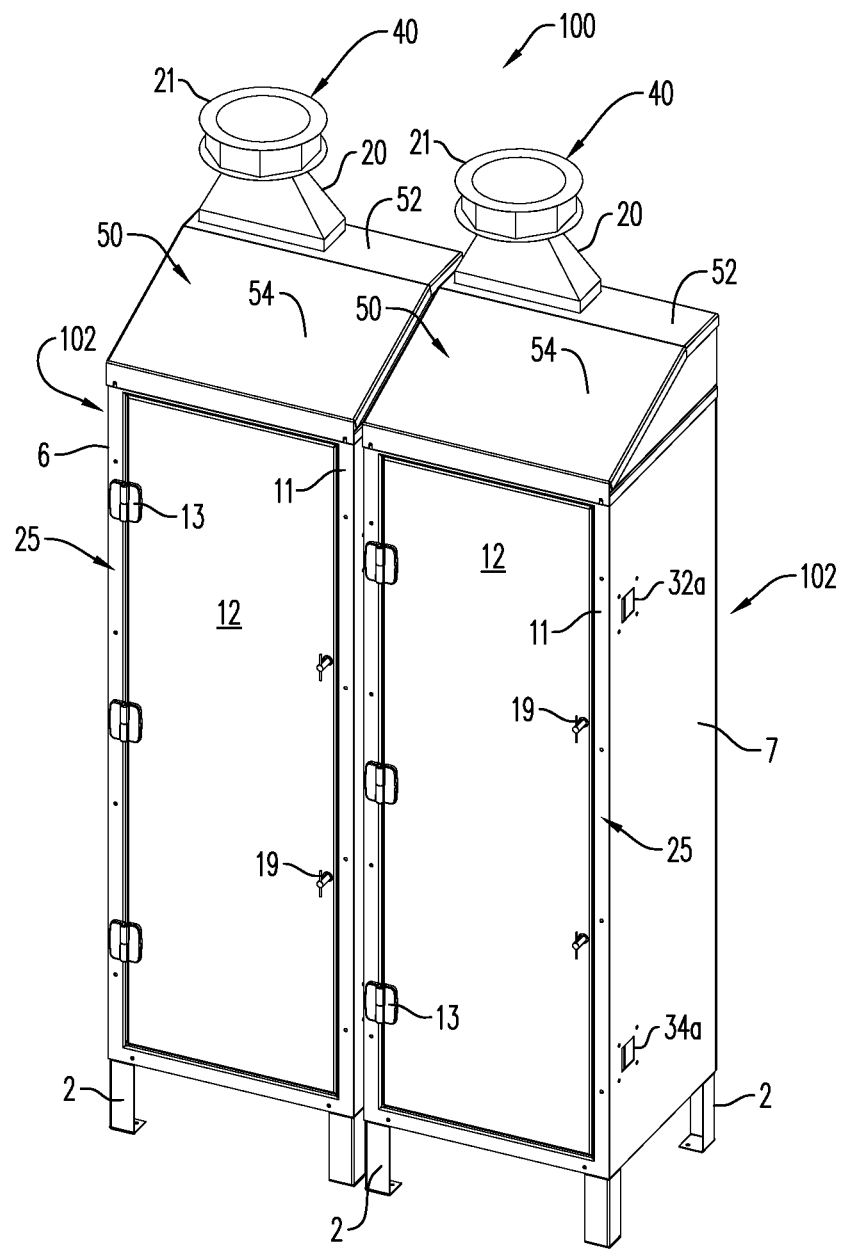
FIG. 4 is an exterior perspective view of two housing units, interoperably connected to form a 2-Pack of the system of FIG. 1.
Figure 5:
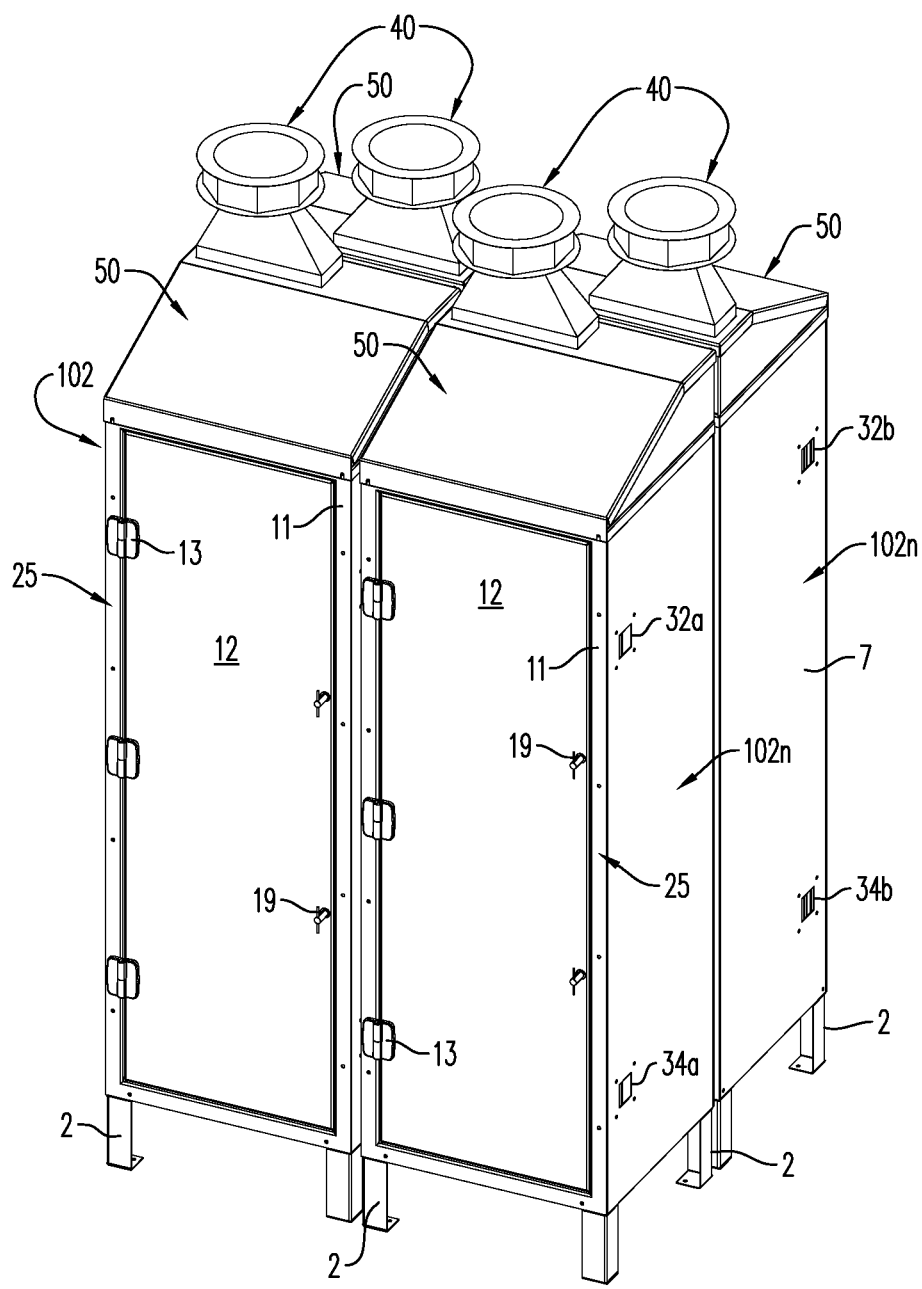
FIG. 5 is an exterior perspective view of four housing units, interoperably connected to form a 4-Pack of the system of FIG. 1.
Figure 6:
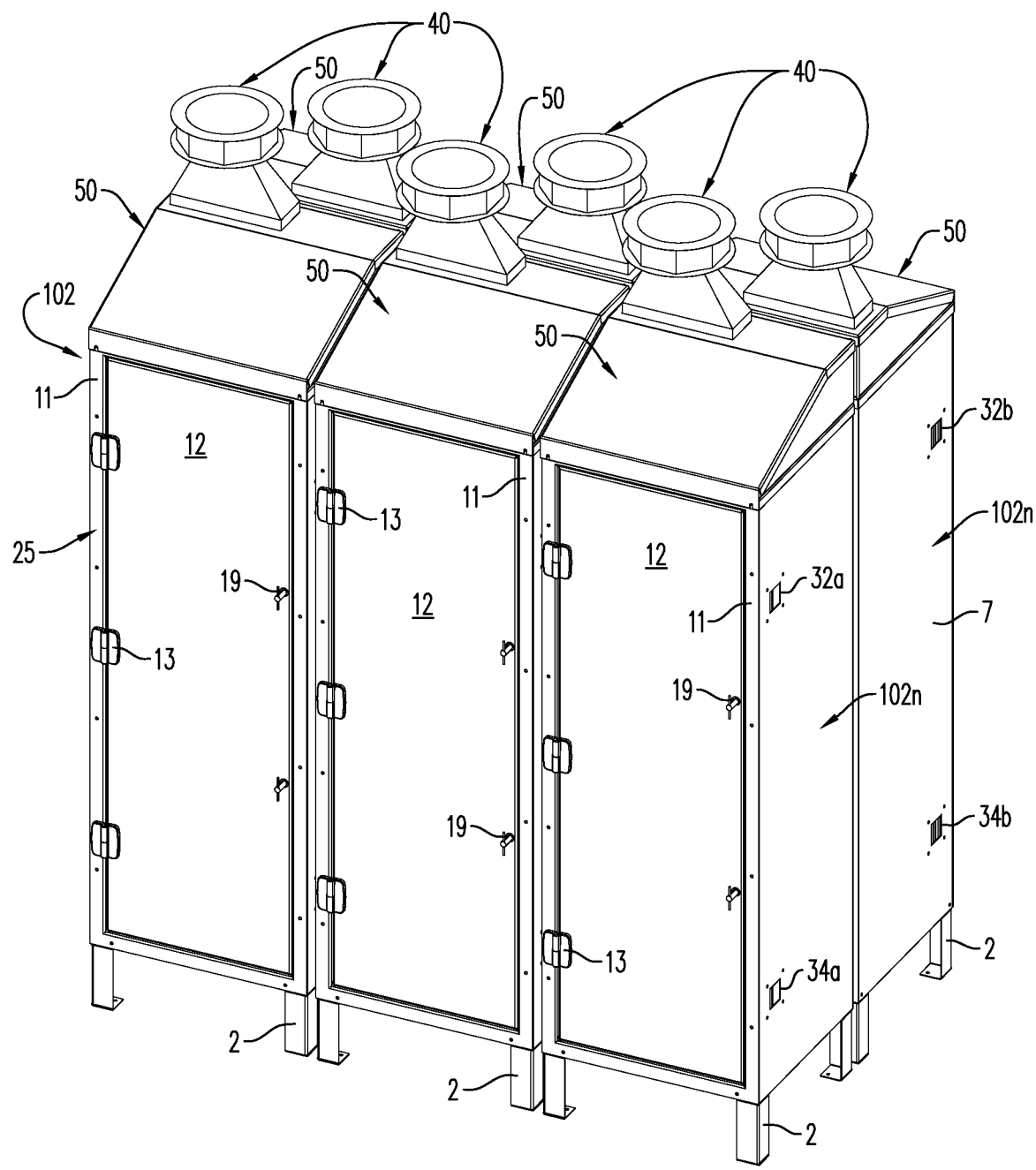
FIG. 6 is an exterior perspective view of six housing units, interoperably connected to form a 6-Pack of the system of FIG. 1.
Figure 7:
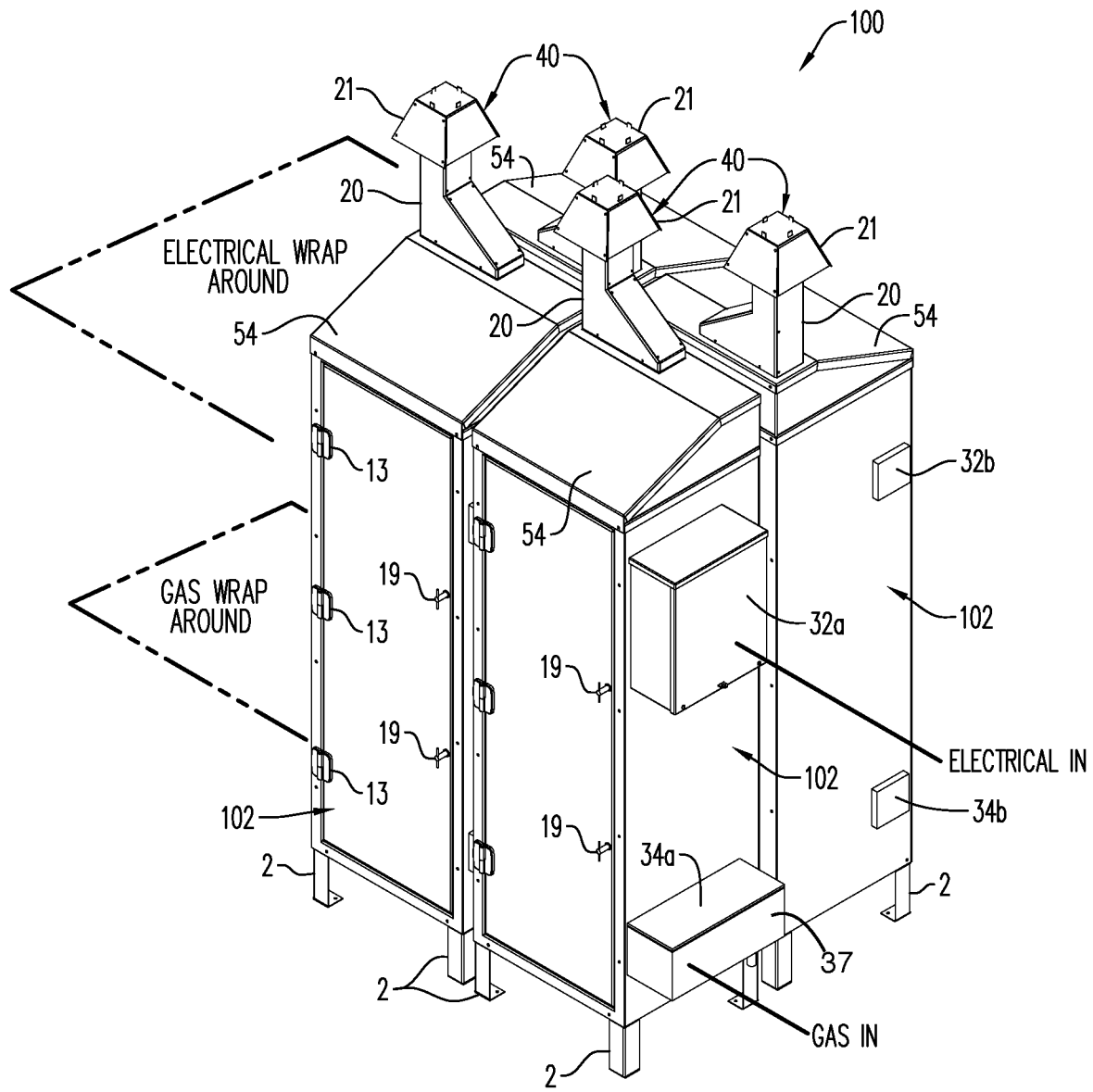
FIG. 7 is an exterior perspective view of the 4-Pack of the system of FIG. 5, illustrating the electrical and gas connections of the system.

The weatherization system 100 may include a single housing 102, as illustrated in FIGS. 1-3. According to an aspect and as illustrated in FIGS. 4-7, a plurality of housings 102 may be connected together to form the weatherization system 100. FIG. 4 illustrates a 2-pack system including two housings 102, FIGS. 5 and 7 illustrate a 4-pack system including four housings 102, and FIG. 6 illustrates a six-pack housing including six housings 102. The left side panel 6 and the right side panel 7 of each of the housings 102 may include one or more connecting mechanisms/interoperable connectors 30. In an embodiment, the back panel 14 may also include interoperable connectors 30 (not shown). The connectors 30 may be mounted on the exterior facing side of the left side panel 6 and the right side panel 7, and may allow one housing 102/102a to be interoperably connected to a second housing 102b (FIG. 4) or a plurality of subsequent housings 102n (FIGS. 5-7), which hosts a second or subsequent system for methane emission control.

The connecting mechanisms 30 may include a power inlet and power outlet ports 32a, 32b and methane/gas inlet and methane/gas outlet ports 34a, 34b. According to an aspect and as illustrated in FIG. 7, the power inlet port 32a in combination with the power outlet port 32b allow the power supplied to the housings 102, to be daisy-chained from one housing 102a to another housing 102b or subsequent housings 102n. This may include a single point power connection that links all the housings 102a, 102b, 102n together. According to an aspect, the gas inlet port 34a in combination with the gas outlet port 34b, provide a path that facilitates/ allows entry of vented gas from an external pipe. The gas outlet port 34b allow the vented gas flow to flow from the housing 102a to the second or subsequent housings 102b, 102n to introduce the vented gas flow into an enclosed interior volume of the second or subsequent housing 102b, 102n through the second or subsequent housing's 102b, 102n gas inlet port 34a. When there are multiple units in a pack arrangement (FIGS. 4-7), the methane gas may be daisy-chained to individual heater gas control valves of each housing 102. This allows the vented gas flow to interact with a second catalytic heating assembly disposed within the second or subsequent housing 102b, 102n. The interoperable connection for the methane and/or other gas may be a piping that enters the housing 10 through a small connector/ opening that attaches to the gas inlet port 34a. According to an aspect, the methane may then be directed toward the catalytic heating assembly 35 including the catalytic heater 10, where an oxidation reaction converts the methane into carbon dioxide by directing the gas to a catalyst pad of the catalytic heater 10. The catalyst pad may include a metal catalyst, such as platinum, palladium, or similar precious metals.

The connectors or connecting mechanisms 30 may connect a vented gas flow casing/gas connection casing 37, as illustrated in FIG. 7 for example, to the housing 102. According to an aspect, the gas connection casing 37 is arranged on the exterior of the housing 102. Similar to the surface of the housing 102 described hereinabove, the connectors 30 may include materials resistant to degrading from the effects of one or more weather or atmospheric factors noted above. To be sure, external/exterior surfaces or components of the housing 102 and internal surfaces/components of the housing 102 (such as, apertures for gas flow and electrical connections, seams along which the various panels meet, and openings of the panels and various components of the system) may be made weather-resistant through the use of various means. As described hereinabove, the exterior of the housing 102 may include a surface resistant to degrading from the effects of a set of one or more weather or atmospheric factors. Other components of the system 100 may similarly include weather-resistant surfaces, which reduce the potential negative impact of excessive heat or cold temperatures, humidity, ice, wind and wind-related scoring, and weather-induced electrical shock on the system 100. According to an aspect, the interior of the housing 102 is further made weather-resistant by the use of sealing mechanisms for all seams where the planes defined by each panel or component meet. Such sealing mechanisms include weather caulk, weather strip, gasket, and the like.

Figure 8:
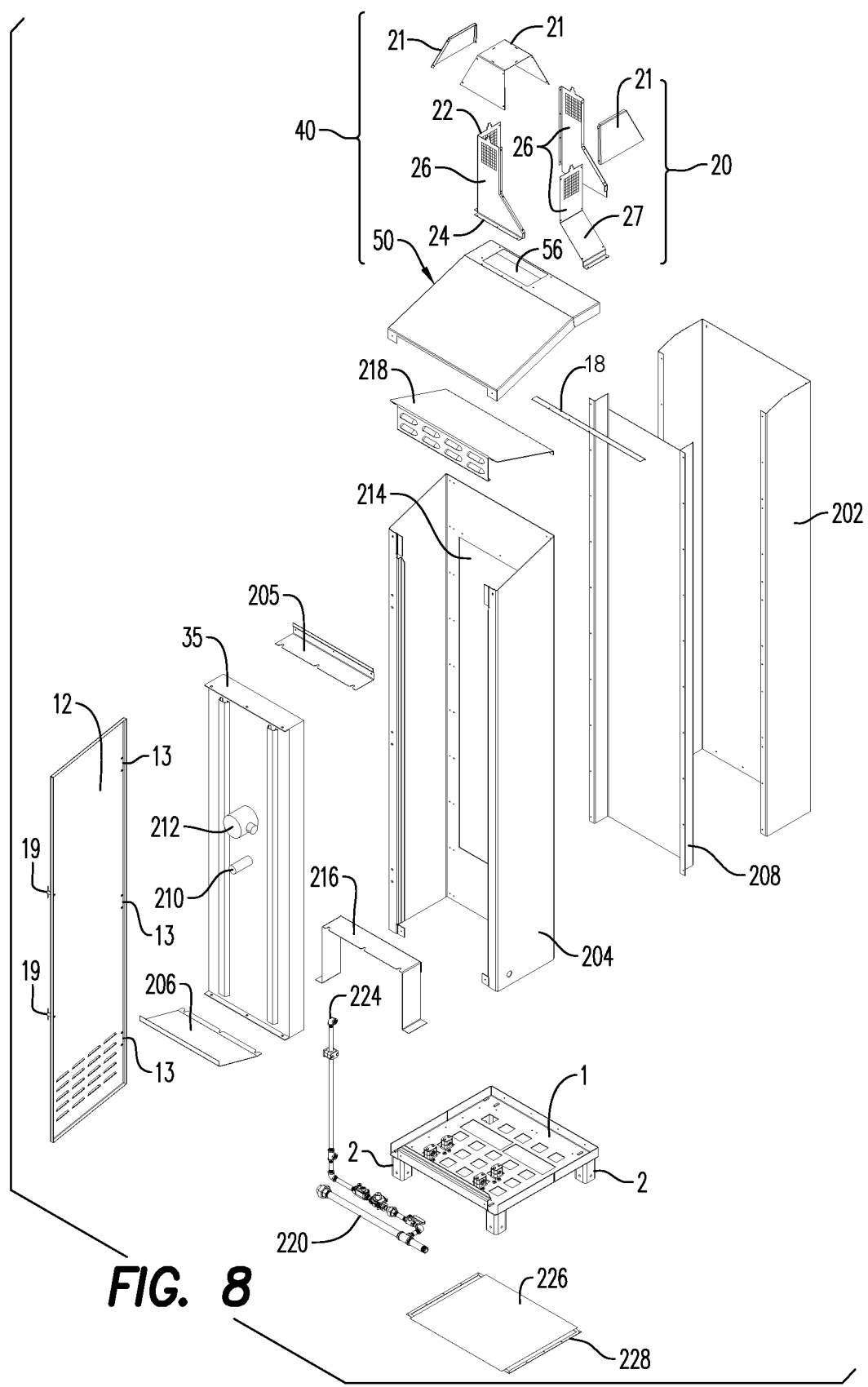
FIG. 8 is an exploded perspective view of a weatherization system for methane emission control for a wellhead, in an unassembled manner, according to an alternative embodiment.
Figure 9:
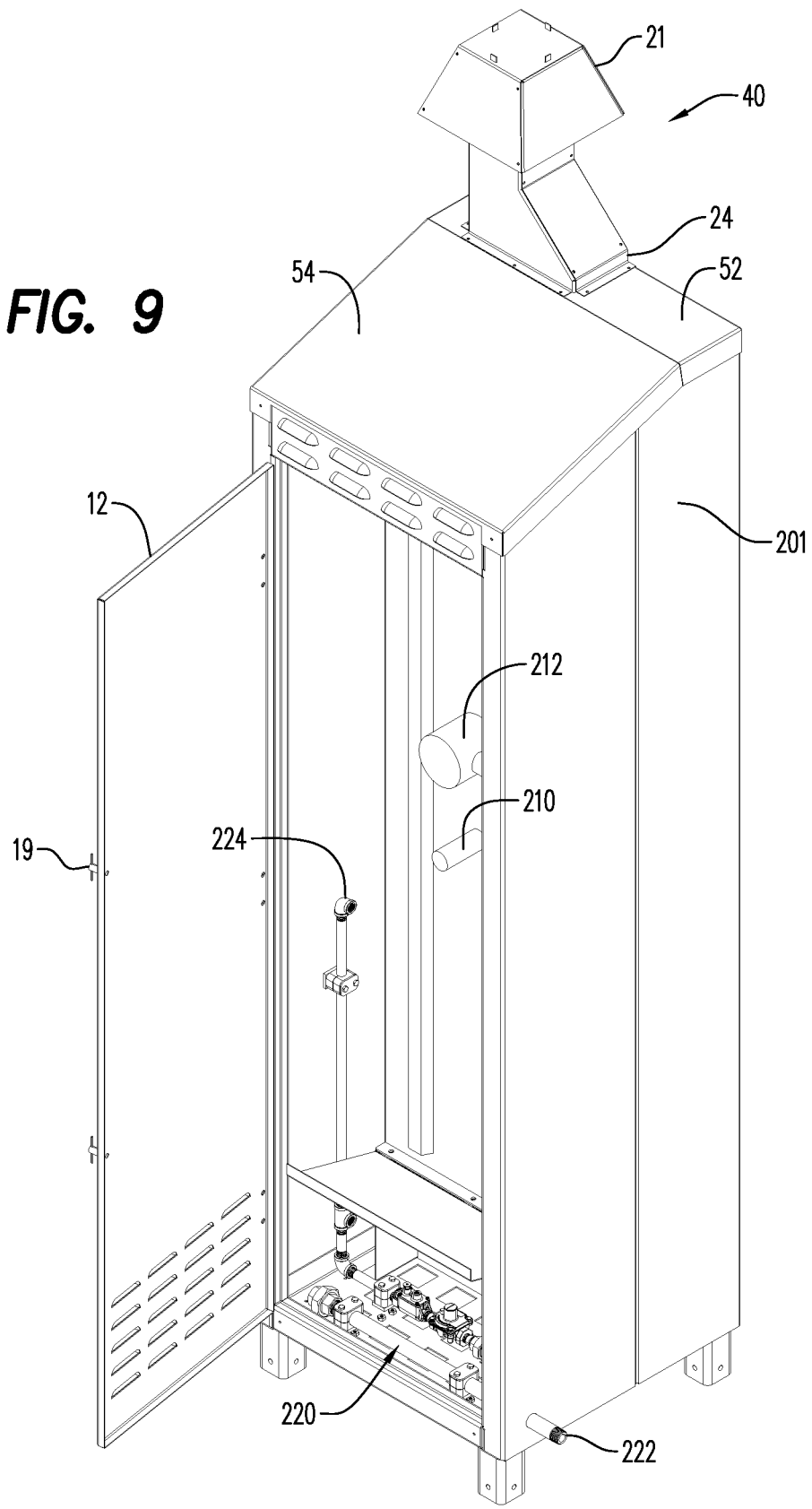
FIG. 9 is a perspective view of a single housing unit for the system of FIG. 8 in an assembled manner, illustrating portions of the exterior and the interior thereof.

FIGS. 8-9 illustrate an alternative embodiment weatherization system 200. The weatherization system 200 provides a weather-resistant means for methane emission control for a wellhead (not shown). The wellhead may be a natural gas or oil wellhead. One aspect of such a control system is to reduce green-house gas emissions into the atmosphere by providing a means for converting the flow of methane gas into carbon dioxide and water vapor. The system 200 causes vented gases to be directed from a wellhead toward the system 200 by a control valve (not shown) and piping so as to prevent the emission of methane to the atmosphere during the drilling process associated with oil and gas delivery. When in use, the valve is open to allow methane gas coming from the well casing to be directed toward a housing 201 of the system 200.

The weatherization system 200 may include a stack assembly 40, which helps prevent weather or atmospheric factors from entering the housing 102 of the system 200. The weather or atmospheric factors may include one or more of rain, snow, sleet, hail, ice, particulates, wind and wind-related structural damage, and other weather-propelled matter.

The stack assembly 40 may include a stack adapter 20. The stack adapter 20 includes an upper portion 22 and a lower portion 24. The lower portion 24 is configured for engaging the housing 201. A plurality of walls 26 extend between the upper and lower portions 22, 24, with at least one of the plurality of walls 26 including a sloped region 27. According to an aspect, the sloped region 27 helps to prevent the weather or atmospheric factors from accumulating at the upper portion 22 of the stack adapter 20.

The stack assembly 40 may further include a stack cover 21 adjacent the upper portion 22 of the stack adapter 20. The stack cover 21 may have an open upper end, which forms an exhaust point that facilitates exhaust flow out of the housing 201. According to an aspect, the stack cover 21 includes a cylindrical shape (FIGS. 3-6). The stack cover 21 may include a substantially pyramidal shape, with an upper region that is smaller in size than a corresponding lower region to help prevent or substantially reduce the accumulation of weather or atmospheric factors on the stack assembly 40. The pyramidal shape of the stack cover 21, in combination with the rectangular shape of the housing 201, may help to equalize the potential effect of directional wind on the system.

According to an aspect, the weatherization system 200 further includes a housing cover 50 adjacent the housing 201. The housing cover 50 may include a first panel 52 and a second panel 54 extending from or otherwise coupled to the first panel 52. Housing cover 50 may be formed from a single piece of sheet metal. As illustrated in FIG. 8, an opening 56 extends through the first panel 52. The stack adapter 20 may be coupled to the housing cover 50 so that the stack adapter extends over and covers the opening 56. This may help to facilitate exhaust flow out of the housing 201. According to an aspect, the housing cover 50 is directly connected to the housing 201.

Further embodiments may be associated with a weatherization system 200 that includes a housing 201 that forms an enclosed interior volume, a catalytic heater 10 disposed within the interior volume of the housing 201, and a stack assembly 40 in a covering relationship with the housing 201. The stack assembly 40 is substantially similar to the stack assembly 40 described hereinabove and illustrated in FIG. 1. Thus, for purposes of convenience and not limitation, the features and limitations of the stack assembly 40 described herein with reference to FIG. 1 are not repeated hereinbelow.

The housing 201 for the system 200 may be in the form of a substantially rectangular shape, such as a "shed". According to an aspect, the housing 201 includes a plurality of panels secured to a base 1. It is contemplated that the panels may be formed from a single metal sheet that is bent to form a three-dimensional structure, such as, for example a substantially U-shape or substantially rectangular shape.

This may reduce the number of panels that need to the assembled to form the housing 201, as well as the time required to form the system 200. The outer surface of the housing 201 (i.e., the external surfaces of the panels) may be resistant to degradation that may result from exposure to one or more weather or atmospheric factors. As used herein, the phrase "resistant to degradation" means that the related structure maintains its structural integrity and its function for several years of exposure to the aforementioned weather or atmospheric factors.

According to an aspect, the housing 201 includes a perforated base plate 1. The base plate 1 may include an arrangement of a front edge 1a, a back edge 1b, a left side edge 1c and a right side edge 1d described previously and illustrated in FIG. 1. According to an aspect, the perforations of the base plate 1 help allow the passage of air coming from an underside the housing 201 to enter the housing 201. A filter 226 may cover the perforations of the base plate 1 on either the top or bottom side of the base plate 1. According to an aspect, the filter 226 prevents particulate matter or other impurities from entering the enclosed interior volume of the housing and causing degradation of the catalyst or housing interior by mixing with the methane or the catalyzed constituents. Filter 226 may also perform the function of and be referred to as an insect screen. The filter 226 may include a mesh material. Additionally, a filter frame 228 may secure the filter 226 in place on top of or below the base plate 1. The filter frame 228 may include u-shaped brackets that engage a structure (not shown) on the base plate 1, thus holding the filter 226 in place relative to the base plate 1.

The panels of the housing 201 are each attached to the perforated base plate 1. The panels include a back enclosure panel 202 and a front enclosure panel 204. The back enclosure panel 202 may help to isolate the hot interior of the housing from the external surfaces of the housing 201 to prevent users/operators of the weatherization system from being directly exposed to the high temperatures within the housing 201. The U-shape or substantially rectangular shape of the back enclosure panel 202 and front enclosure panel 204 result in an efficient and cost-effective way to assemble the components (such as the panels) of the housing 201.

Among other advantages, separate structures forming the left side panel 6 and the right side panel 7 of the embodiment illustrated in FIG. 1 are eliminated in this weatherization system 200. Each panel may be attached to the base plate 1 by any conventional attachment/fastening mechanism. According to an aspect, the panels are attached to the base plate 1 by screws, nuts and bolts, studs and bolts, rivets, and the like. The back enclosure panel 202 is attached to the back edge 1b, the left edge 1c and the right edge 1d of the base plate 1 at a bottom edge of the back enclosure panel 202. The back enclosure panel 202 defines the entire back wall of the housing 201 as well as substantial portions of the right side wall and left side wall of the housing 201. Similarly, the front enclosure panel 204 is attached to the front edge 1a, the left edge 1c and the right edge 1d of the base plate 1 at a bottom edge of the front enclosure panel 204. The front edge panel 204 defines the remaining portions of the right side wall and left side wall of the housing 201 and may also define the front wall of the housing 201.

Instead of the front edge panel defining the front wall of the housing 201, the front edge panel 204 may include an opening above the front edge 1a of the base plate 1 to accommodate a door 12 providing access to at least a portion of the volume defined by the housing 201. According to an aspect, a frame/doorframe 11 may secure the door 12 to the housing 201 as in FIG. 1. According to another aspect, the door 12 may be secured directly to the housing 201, i.e., a plurality of hinges 13 may have one end attached to the door 12 and the other end attached to the front edge panel 204. The hinges 13 allow the door 12 to move between an open position and a closed position. While the hinges 13 are illustrated as being coupled to a left side edge of the door 12, it is contemplated that the hinges 13 may be coupled to a right side edge of the door 12 (not shown). To facilitate user access to the internal space of the housing 201, at least one handle 19 may be coupled to the door 12. The handle 19 facilitates the secure opening and closing of the door 12.

A top front vent 218 may be disposed above the door 12 and occupy the top portion of the opening in the front enclosure panel 204. This top front vent 218 is helpful in dissipating heat generated on the inlet side of the catalytic heater assembly 35. A set of vent holes in the bottom of door 12 may be configured to dissipate heat generated on the inlet side of the catalytic heater assembly 35 in the area of gas piping 220. The top front vent, in combination with the set of vent holes the bottom of the door 12, may help to protect the gas shut off valve, located in the gas piping assembly, from damage due to excess temperatures.

According to an aspect, the housing 201 further includes an elevation mechanism 2 for maintaining the housing 201 is a spaced apart configuration from a floor or ground surface. The elevation mechanism 2 is located on the underside of the base plate 1. The elevation mechanism 2 may help to facilitate the flow of cool air from under the housing 201 into the interior volume of the housing 201, to aid in driving warm air up and out of the stack assembly 40. The elevation mechanism 2 may protect the inlet/enclosure from standing/accumulating snow, ice, water, and the like. According to an aspect, the elevation mechanism 2 includes a plurality of "feet" or "legs" that are affixed to the underside of the base plate 1 by screws or similar conventional means, and in such a location as to optimize the stability of the housing 201 relative to the ground plane and facilitate air flow. The elevation mechanism 2 may include a frame apparatus/structure mounted to the underside of the base plate. The selected elevation mechanism 2, feet or frame apparatus, may be shaped and sized to fit the particular needs of the application and may be based on where the housing 201 is to be located.

The weatherization system 200 further includes a catalytic heating assembly 35. The catalytic heating assembly 35 is positioned above the perforated base plate 1 and within the enclosed interior volume of the housing 201. An opening in the rear wall of the front enclosure panel 204 may be sized to receive the catalytic heating assembly 35. The catalytic heating assembly 35 may be supported at its bottom edge by a heater support bracket 216. The heater support bracket may be attached to the base plate 1/heater base. A servicing mechanism 205 attached adjacent the top of the rear wall opening of the front enclosure panel 204 may support and maintain in place, e.g., with screws or bolts, the top of the catalytic heating assembly. The servicing mechanism 205 element may be the only structure within housing 201 that is rigidly attached to the catalytic heating assembly 35. Thus, disengaging the rigid attachment, e.g., screws or bolts, between the servicing mechanism 205 and the catalytic heating assembly 35 enables complete removal of the catalytic heating assembly 35 for servicing or replacement; hence the name, servicing mechanism 205. The catalytic heating assembly 35 includes a diffuser plate that distributes and mixes the gas with air that has entered the housing via the base plate 1. This gas/air mixture is passed through a platinum-infused substrate which, with the proper ignition temperature, causes an exothermic reaction of the gas, creating carbon dioxide and water vapor. The platinum-infused substrate inside that catalytic heating assembly 35 acts a catalyst that lowers the amount of energy necessary for the oxidation reaction of methane and oxygen to take place. This catalyzed oxidative reaction generates heat and infrared light.

As illustrated in FIGS. 8-9, a vented gas piping connector 222 conveys gas vented from the wellhead into housing 201. As stated previously, the purpose of the embodiment is treatment of the gas vented from the wellhead in the housing 201. For example, methane contained in the vented gas may be oxidized and, thus, be transformed into carbon dioxide and water vapor. Gas piping 220 conveys the vented gas from the vented gas piping connector 222, which is external to housing 201, to the internal gas piping connector 224. A flexible gas connector line (not shown) connects internal gas piping connector 224 to the gas connector 210 of the catalytic heating assembly 35.

The cold air/airflow enters the housing 201 by passing through the base plate 1 and the filter 226 before rising in the presence of the catalytic heating assembly 35. Cold airflow, relative in temperature to the exhaust flow, primarily enters from beneath the housing 201 and enters the housing through the base plate 1.

The exothermic reaction of the vented gas in the presence of oxygen in the air, breaks down the vented gas into carbon dioxide. While passing through the catalytic heating assembly 35, the concentration of vented gas is greatly reduced and the concentration of carbon dioxide in the air increased. The air having increased carbon dioxide concentration comprises the great majority of exhaust flow and the temperature of this exhaust flow is substantially greater than the temperature of the vented gas and air mixture that entered the catalytic heating assembly 35. The bulk fluid flow from bottom to top in the housing and, thus, through the catalytic heating assembly 35 is the result of the difference in temperature between the vented gas/air mixture and the exhaust products.

According to an aspect, a lower heater shield 206 may be provided to separate a portion of the volume defined by the front enclosure panel 204 and the door 12 from the remainder of the volume. The lower heater shield 206 prevents heat from the catalytic heater assembly 35 from interfering with the functioning of elements below the lower heater shield. Such elements include the base plate 1, the apertures in base plate 1, the filter 226 and the gas piping 220.

According to an aspect, the start-up of the catalytic heating assembly 35 may be facilitated by an electrical preheat current. The current may be provided by a temporary power source, such as a generator, which transports the power through a small housing that may attach to a power inlet port on housing 201 similar to the ports 32a shown in FIG. 1. The catalytic heater assembly 35 may be powered by a battery (not shown), which preserves the integrity of the housing 201 by not requiring additional apertures in the panels of the housing 201. According to an aspect, a conventional power line may power the catalytic heater assembly 35. Whether externally or internally electrically powered for start-up, an electric connection 212 to the heater assembly 35 may be located almost anywhere on the catalytic heating assembly. The electric connection 212 is electrically connected to a heating element (not shown) located on or within the catalytic heating assembly 35. Once the catalytic reaction begins, the reaction causes methane to break down into carbon dioxide and water, the heat generated by this exothermic reaction is sufficient to maintain the reaction.

An infrared absorption panel 208 may be attached between the back enclosure panel 202 and the front enclosure panel 204. The infrared absorption panel 208 may be configured to absorb and radiate heat that results from the catalytic reaction. According to an aspect the infrared absorption panel 208 includes a dark surface, which helps to generate heat to maintain the reaction. A volume of the housing 201 interior is defined between the infrared absorption panel 208 and the exhaust side of the catalytic heater assembly 35. Heated exhaust will immediately flow upward upon exiting the catalytic heater assembly 35 and will be prevented from flowing immediately into the volume defined by the back enclosure panel 202. This flow pattern may prevent much of the housing 201, especially lower sections thereof, from becoming excessively hot. According to an aspect, the system 200 does not have structural elements between the exhaust side of catalytic heater assembly 35 and stack assembly 40. Rather, the carbon dioxide enriched, heated exhaust air from the catalytic heater assembly 35 is, partly as a result of the presence of the infrared absorption panel 208, efficiently passed upward in the housing 201 toward stack assembly 40 and thence out of the housing 201.

According to an aspect, the system 200 includes a housing cover 50. The housing cover 50 comprises the top of housing 201 and may includes a first panel 52 and a second panel 54 coupled to or otherwise extending from the first panel 52. The first panel 52 may be parallel to the ground or floor surface on which the weatherization system 200 is positioned. The second panel 54 slopes downwardly away from the first panel 52. An opening 56 extends through the first panel 52 and the stack adapter 20 of stack assembly 40 is disposed over the opening 56, which allows the exhaust gases to pass through or vent through the stack assembly 40.

According to an aspect, one or more drip edges 18 may be secured to the housing cover 50. The drip edges 18 are configured to control the flow of liquid, particularly in the event that windblown rain damages the housing, enters the stack assembly, and runs along the inside of the stack adapter 20. The drip edges 18 may be configured to prevent that water from reaching the catalytic heating assembly 35, instead diverting the water so it drips down into the cavity formed by the back enclosure panel 202 and the infrared absorption panel 208.

Further embodiments of the present disclosure may be associated with a weatherization system 200 for a wellhead methane emission reduction system, which includes one or more sensors 45, as shown in FIG. 1, mounted within the housing 201. Each of the sensors 45 can be utilized for measuring the effects of weather or atmospheric factors on the system 200. According to an aspect, the sensors may include one or more of a sensor for measuring temperature, a sensor for measuring humidity, a sensor for measuring vibration within the housing 201, and a sensor for measuring gas content within the housing 201. The sensors 45 may be interoperably connected with a transmitter (not shown) to transmit a set of data from each sensor to a central processing unit (not shown). The central processing unit may generate a report that is illustrative of the temperature, humidity, vibration and gas content of the housing 201. The central processing unit may be co-located with or may be at a location remote to the housing 201.

Figure 10:
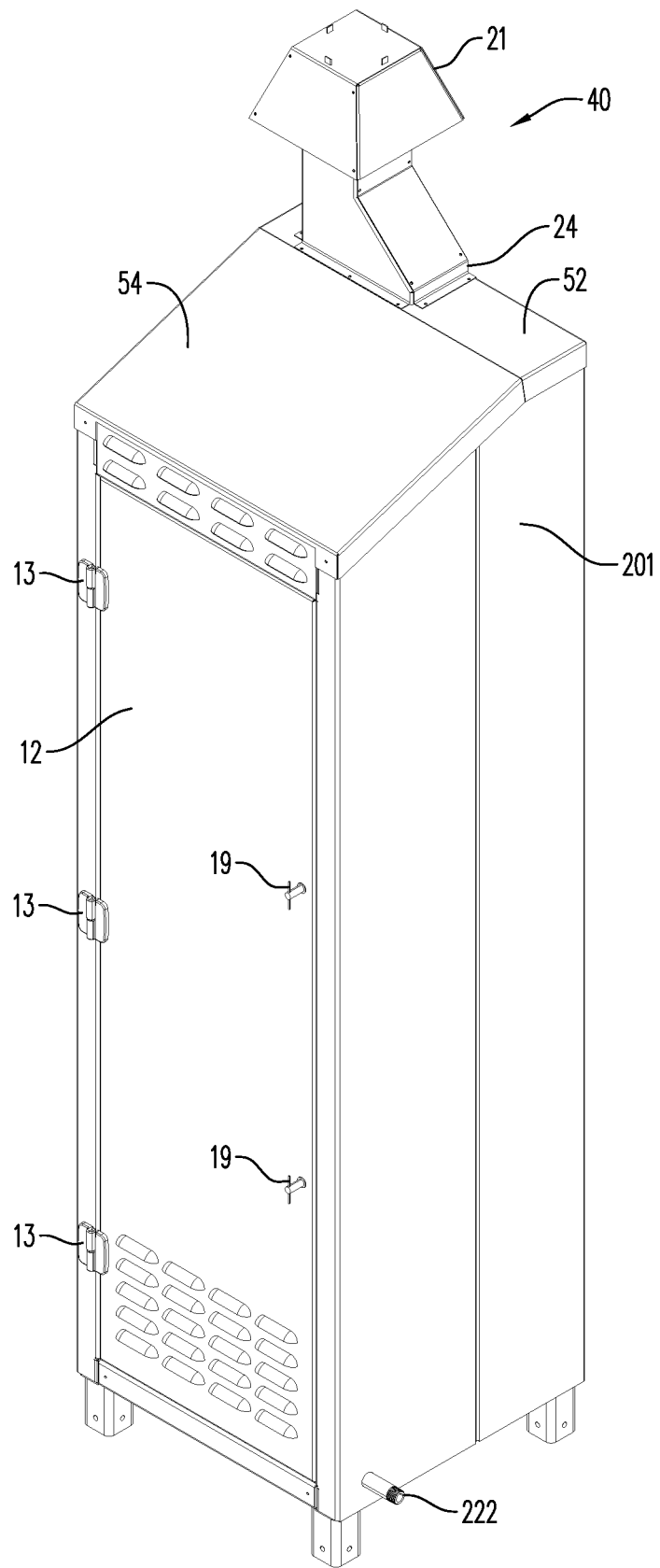
FIG. 10 is an exterior perspective view of a single housing unit for the system of FIG. 8.

FIG. 10 is an exterior perspective view of a single housing unit of the alternative embodiment weatherization system 200. As with any embodiment of the weatherization system 200, multiple units of weatherization system 200 may be interoperably connected to form, e.g., 2-pack (FIG. 4), 4-pack (FIG. 5), 6-pack (FIG. 6) etc., versions of the system 200.

Figure 11:
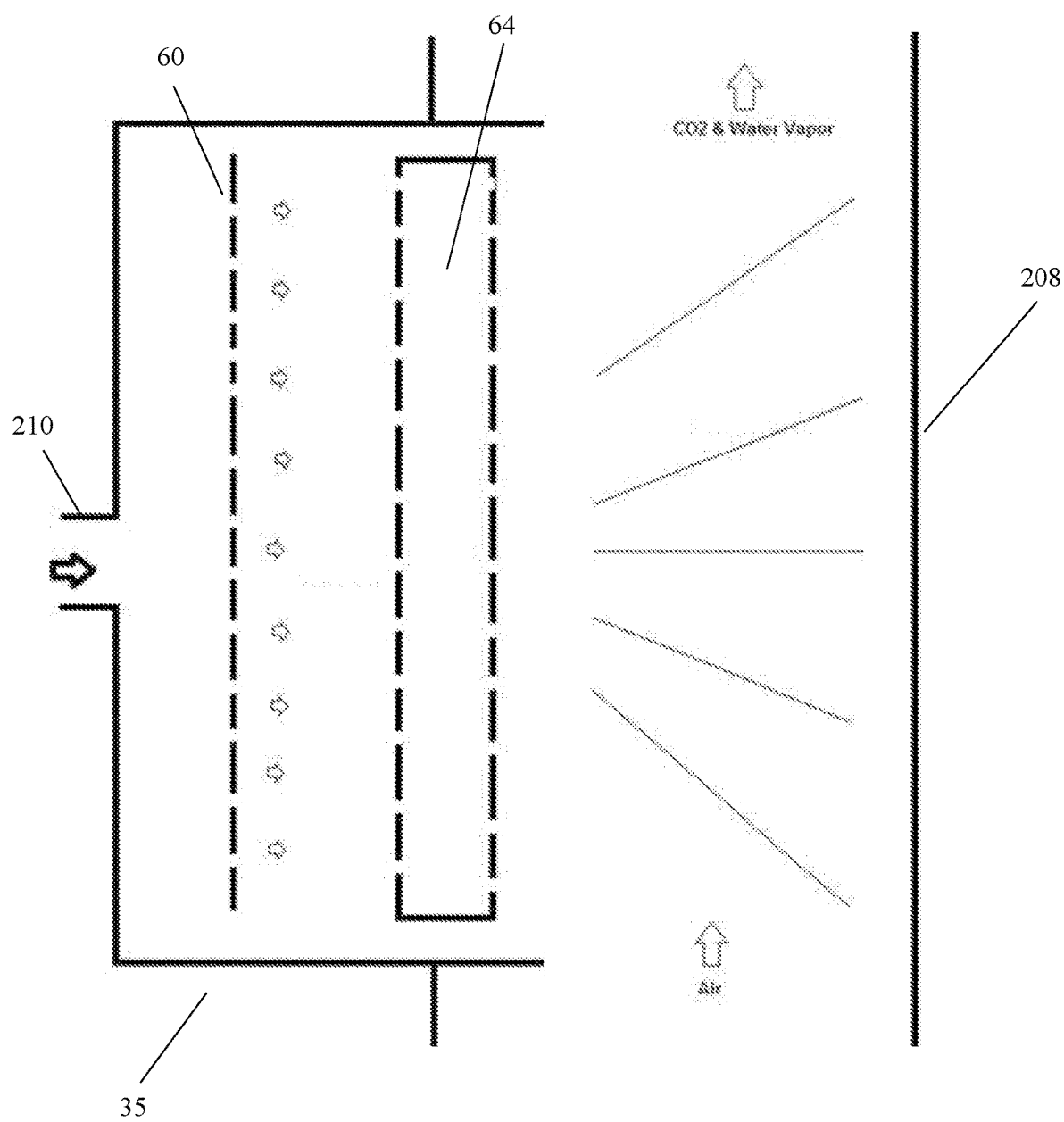
FIG. 11 is a schematic view depicting a side cross-section of the fluid flows, e.g., air and gas, into, through and out of a catalytic heating assembly for the system of FIG. 8.

FIG. 11 is a schematic, cross-sectional view of the catalytic heating assembly 35 from the side. The primary component of the catalytic heating assembly 35 are the gas connector 210, a perforated plate 60, and a catalytic pad 64. Vented gas is brought from the wellhead through gas piping 220 and flexible gas connector line (not shown) to catalytic heating assembly 35 by way of gas connection 210. Air enters the catalytic heating assembly 35 from below. Mixing of air and vented gas is increased by passing both through perforated plate 60. The fluid exiting perforated plate 60 is a mixture of air and vented gas. It is this mixture that enters catalytic pad 64. Catalytic pad 64 contains elements over which the air/vented gas mixture is passed; these structures are coated with a platinum catalyst. In accordance with reactions known in the art, the platinum catalyst lowers the temperature at which the exothermic reaction of an air/methane mixture into carbon dioxide and water vapor. Thus, although similar to the 'burning' of methane using a spark or flame, the platinum catalyst achieves the oxidation of methane into carbon dioxide and water at lower temperatures. Thus, the inputs to the catalytic pad 64 are air and vented gas while the outputs are carbon dioxide, water vapor and heat. The heat generated by the exothermic catalytic reaction is expressed in the form of infrared light. Infrared absorption panel 208 absorbs much of the infrared light from the reaction. To the extent exothermic heat is in excess of the heat needed to maintain catalytic pad 64 at the proper temperature for the catalytic reaction, infrared absorption panel 208 will radiate that heat into the volume enclosed by back enclosure panel 202.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A weatherization system for a wellhead methane emission reduction system, the system comprising:
 a housing forming an enclosed interior volume;
 a stack assembly coupled to the housing, wherein the stack assembly comprises
  a stack adapter comprising
   an upper portion,
   a lower portion configured for engaging the housing, and
   a plurality of walls defining the lower portion, wherein at least one of the plurality of walls has a sloped region;
 a housing cover adjacent the housing, wherein the housing cover comprises:
  a first panel;
  a second panel extending from the first panel in a sloped configuration; and
  an opening extending through the first panel; and
 a stack cover coupled to the upper portion, wherein the stack cover forms an exhaust point configured to facilitate exhaust flow out of the housing,
  wherein the stack adapter is coupled to a topside of the housing cover and extends over the opening and the stack assembly is configured to prevent weather and atmospheric factors from entering the housing.

2. The weatherization system of claim 1, wherein the stack cover comprises one of a cylindrical shape, a substantially pyramidal shape and a substantially rectangular shape.

3. The weatherization system of claim 1, further comprising:
 a housing adapter coupled to an underside of the housing cover.

4. The weatherization system of claim 1, wherein the housing comprises:
 a back enclosure panel comprising a back wall and two side walls extending away from the back wall, wherein the two side walls are spaced apart from each other; and
 a front enclosure panel secured to free ends of the two side walls.

5. The weatherization system of claim 3, further comprising:
 an infrared absorption panel between the back enclosure panel and the front enclosure panel.

6. A weatherization system for a wellhead methane emission reduction system, the system comprising:
 a housing forming an enclosed interior volume, wherein an outer surface of the housing is resistant to degrading from the effects of one or more weather or atmospheric factors;
 a catalytic heating assembly disposed within the housing, the catalytic heating assembly configured to apply a level of heat sufficient to cause an exothermic oxidative reaction to a flow of a vented gas across the catalytic heating assembly, wherein the exothermic oxidative reaction is configured to break down the vented gas into carbon dioxide and water vapor to form an exhaust flow;
 a stack assembly in a covering relationship with the housing, the stack assembly comprising
  a stack adapter comprising an upper portion, a lower portion configured for engaging the housing, and a plurality of walls defining the lower portion, wherein at least one of the plurality of walls has a sloped region, and
  a stack cover coupled to the upper portion of the stack adapter, wherein the stack cover forms an exhaust point configured to facilitate exhaust flow from the housing,
  wherein the stack assembly protects the wellhead methane emission reduction system by preventing the weather or atmospheric factors from entering the housing;
 a perforated base plate positioned at a lower end of the housing, wherein the perforated base plate is coupled to a back enclosure panel and the front enclosure panel;
 a filter disposed on top of the base plate;
 a perforated filter cover disposed above the filter; and
 an elevation mechanism for elevating the housing above a floor or ground surface.

7. The weatherization system of claim 6, further comprising:
 a vented gas flow casing originating at the wellhead; and
 a gas flow input valve interoperably connecting the vented gas flow casing with the housing,
 wherein the interoperable connection comprises materials resistant to degradation from the effects of the one or more weather or atmospheric factors.

8. The weatherization system of claim 6, wherein:
 the back enclosure panel comprises a back wall and two side walls extending away from the back wall, wherein the two side walls are spaced apart from each other; and
 the front enclosure panel is secured to free ends of the two side walls.

9. The weatherization system of claim 8, wherein the panels each comprise a top edge and the system further comprises:
 a housing cover adjacent the top edges of the panels, wherein the housing cover comprises:
  a first panel;
  a second panel extending from the second panel in a sloped configuration; and
  an opening extending through the first panel,
  wherein the stack adapter is coupled to a topside of the housing cover and extends over the opening.

10. The weatherization system of claim 9, further comprising:
 a drip edge secured to the housing cover, wherein the drip edge is configured to prevent the weather or atmospheric factors from reaching the catalytic heating assembly.

11. The weatherization system of claim 8, wherein the two side walls comprises:
 one or more connecting mechanisms, wherein
 the connecting mechanisms allow the housing to be interoperably connected to a second or subsequent housing hosting a second or subsequent system for methane emission control,
 the connecting mechanisms allow the vented gas flow to flow from the housing to the second or subsequent housing to introduce the vented gas flow into an enclosed interior volume of the second or subsequent housing, thus allowing the vented gas flow to interact with a second catalytic heating assembly disposed within the second or subsequent housing.

12. The weatherization system of claim 6, wherein the catalytic heating assembly comprises:
- a heater frame;
- a catalytic heater mounted within the heater frame; and
- a louver panel mounted on a top edge of the heater frame, the louver panel for adjusting exhaust gas flowing toward the exhaust point.

13. A weatherization system for a wellhead methane emission reduction system, the system comprising:
- a housing forming an enclosed interior volume, wherein the housing comprises an outer surface resistant to degrading from the effects of a set of one or more weather or atmospheric factors;
- a catalytic heating assembly disposed within the housing, the catalytic heating assembly configured to apply a level of heat sufficient to cause an exothermic oxidative reaction to a flow of a vented gas across the catalytic heating assembly, the exothermic reaction breaking down the vented gas into carbon dioxide and water vapor to form an exhaust flow;
- one or more sensors mounted within the housing, wherein the sensors are interoperably connected with a transmitter to transmit a set of data from the sensors to a central processing unit;
- a stack assembly in a covering relationship with the housing, the stack assembly comprising
  - a stack adapter comprising an upper portion, a lower portion configured for engaging the housing, and a plurality of walls defining the lower portion, wherein at least one of the plurality of walls has a sloped region, and
  - a stack cover coupled to the upper portion of the stack adapter, wherein the stack cover forms an exhaust point configured to facilitate exhaust flow from the housing, wherein
- the stack assembly protects the wellhead methane emission reduction system and prevents the weather or atmospheric factors from entering the housing, and
- the sensors measure the effects of the weather or atmospheric factors on the wellhead methane emission reduction system.

14. The weatherization system of claim 13, wherein the central processing unit is configured to generate a report illustrative of the measurements of temperature, moisture content, methane and the flow rate of methane.

15. The weatherization system of claim 13, wherein the housing comprises:
- a back enclosure panel comprising a back wall and two side walls extending away from the back wall, wherein the two side walls are spaced apart from each other;
- a front enclosure panel secured to free ends of the two side walls; and
- a perforated base plate positioned at a lower end of the housing, the perforated base plate being coupled to the back enclosure panel and the front enclosure panel.

16. The weatherization system of claim 15, wherein the back enclosure panel and the front enclosure panel each comprise a top edge, and the system further comprises:
- a housing cover adjacent the top edges of the panels of the housing, wherein the housing cover comprises:
  - a first panel;
  - a second panel, wherein the second panel slopes downwardly away from the first panel; and
  - an opening extending through the first panel, wherein the stack adapter is coupled to a topside of the housing cover and extends over the opening.

17. The weatherization system of claim 15, wherein the two side walls comprise
- one or more connecting mechanisms, wherein
- the connecting mechanisms allow the housing to be interoperably connected to a second or subsequent housing hosting a second or subsequent system for methane emission control, and
- the connecting mechanisms allow the vented gas flow to flow from the housing to the second or subsequent housing to introduce the vented gas flow into an enclosed interior volume of the second or subsequent housing, thus allowing the vented gas flow to interact with a second catalytic heating assembly disposed within the second or subsequent housing.

18. The weatherization system of claim 14, wherein the catalytic heating assembly further comprises:
- a heater frame;
- a catalytic heater mounted within the heater frame;
- a diffuser plate mounted within the heater frame; and
- a louver panel mounted on a top edge of the heater frame, the louver panel for adjusting exhaust gas flowing toward the exhaust point.

* * * * *